Feb. 9, 1932. C. E. PAXTON 1,844,437
PARKING MIRROR FOR MOTOR VEHICLES
Filed Aug. 28, 1929
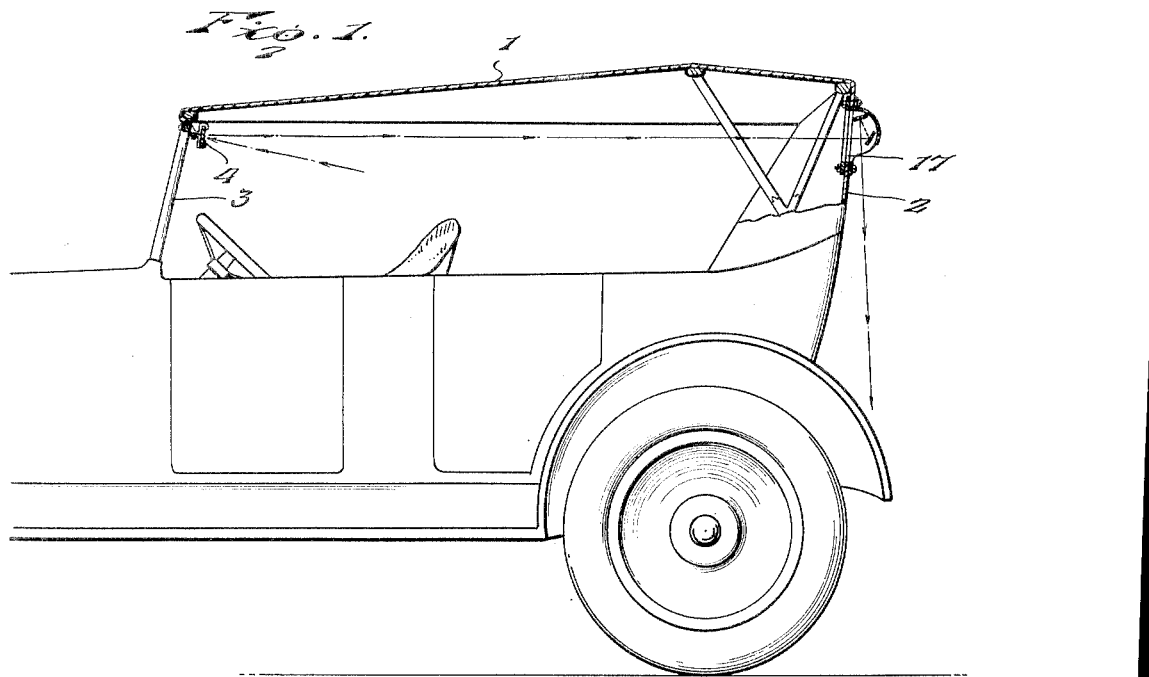
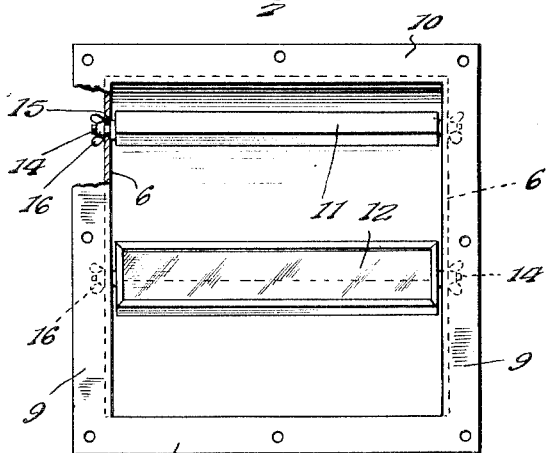
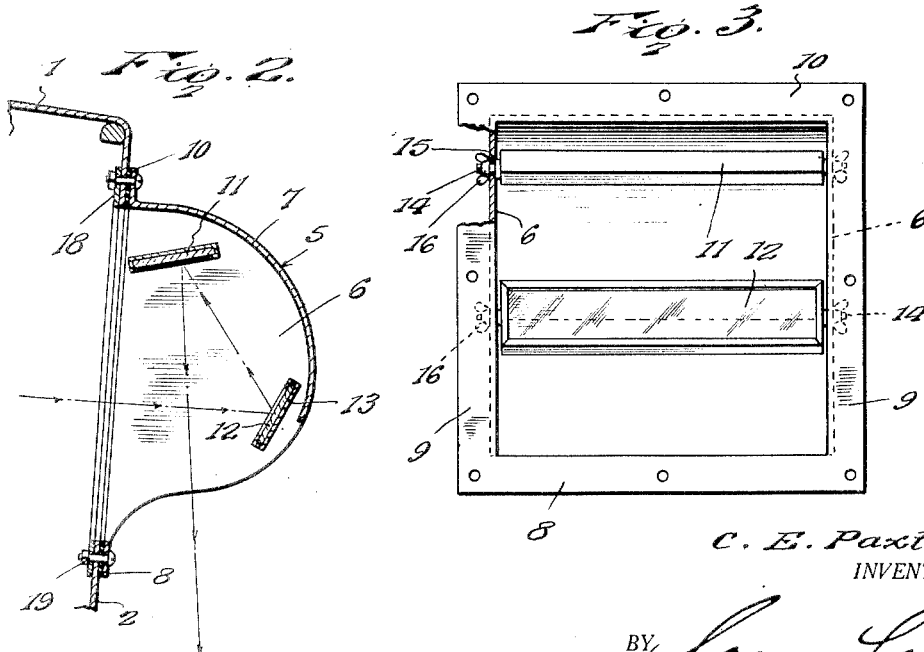
C. E. Paxton.
INVENTOR.
BY *Lacey & Lacey*
ATTORNEYS Patented Feb. 9, 1932

1,844,437

UNITED STATES PATENT OFFICE

CLYDE E. PAXTON, OF ST. JOSEPH, MISSOURI, ASSIGNOR OF ONE-FIFTH TO NEWTON J. RICE, OF ST. JOSEPH, MISSOURI

PARKING MIRROR FOR MOTOR VEHICLES

Application filed August 28, 1929. Serial No. 389,026.

The present invention is directed to improvements in parking mirrors for motor vehicles.

The primary object of the invention is to provide a device of this character so constructed that it can be easily installed upon the rear curtain of an automobile and in a position to cooperate with the usual rear view mirror to enable the driver to observe the surroundings rearwardly of the car without necessity of turning his head.

Another object of the invention is to provide a device of this kind constructed and arranged so that the driver, in parking the car, can readily see the curb stone at the rear of the car in order that the car can be properly parked the desired distance with respect to the curb stone.

With these and other objects in view, as will appear as the description proceeds, the invention consists in the novel features of construction, combination of elements and arrangement of parts, and hereinafter to be fully described and pointed out in the appended claims.

In the accompanying drawings:

Figure 1 is a fragmentary side elevation of an automobile of the touring or open type, the top thereof being shown in section and showing the mirror in position upon the rear curtain thereof, the mirror and its associated parts being shown in section.

Figure 2 is an enlarged vertical sectional view through the improved mirror.

Figure 3 is a front view of the hood and mirrors supported thereby, removed.

Referring to the drawings, 1 designates the conventional form of top of an automobile of the touring type and 2 the rear curtain thereof, said automobile being equipped with the usual windshield 3 above which is mounted the conventional form of rear view mirror 4.

The parking mirror comprises a hood 5, preferably formed from suitable sheet metal and including segmental shaped sides 6 and a curved cover 7, the lower ends of the sides 6 being connected by a bar 8 which merges at its ends with the flanges 9, said flanges having their upper ends merging with the flange 10. It will be observed that the flanges thus arranged will form, in effect, a rectangular frame adapted to be placed upon the outer surface of the rear curtain 2.

Upper and lower mirrors 11 and 12 are employed, said mirrors being mounted in frames 13 the ends of which are provided with trunnions 14 adapted to engage the bearings 15 formed in the sides 6, there being threaded upon the trunnions wing nuts 16, serving to hold the frames and thus the mirrors in their proper adjusted positions.

To install the mirror, it is necessary to cut an opening in the rear curtain 2 and in one of the upper corners thereof, according to the position in which the rear view mirror 4 is mounted. After the opening 17 is cut, the flanges 8, 9 and 10 are placed against the rear face of the rear curtain 2 and in contact with the said curtain, after which a rectangular sheet metal frame 18 is placed upon the inner face of the curtain 2 so that the curtain will be confined between the bars of the frame and the flanges carried by the hood, after which the securing devices 19 are passed through the respective flanges of the hood and through the frame 18, thus firmly uniting the hood and rear curtain. Since the parking mirror is mounted in one of the upper corners of the rear curtain it will in no way interfere with the usual rear view window.

It will be obvious that after the mirrors 11 and 12 are properly adjusted that the driver can, upon glancing into the mirror 4 readily discern the conditions rearwardly of the car being parked, since the active faces of the mirrors 11 and 12 are presented toward each other so that the line of vision will be reflected from the mirrow 12 to the mirror 11 and thence downwardly.

From the foregoing it will be seen that the present invention provides a parking mirror which is exceedingly simple in construction, efficient in operation, durable, and one which can be installed at a small cost.

What is claimed is:

1. In combination with the rear curtain of a vehicle top having an opening therein, a hood fitting against the rear face of the curtain about the opening therein, said hood having its lower portion open, upper and lower mirrors extending transversely in said hood and being pivotally mounted for adjustment, a rear view mirror mounted adjacent the front end of the top and alined with the lower mirror, a frame fitting against the inner face of the rear wall about the opening therein, and fasteners for passing through the frame, curtain and hood to hold the hood in registration with said opening.

2. The combination with the rear curtain of a vehicle top having an opening therein, of a frame fitting against the inner face of the curtain and surrounding the opening, a hood including flanges for engaging the outer face of the curtain about the opening, securing devices passed through the frame, curtain and flanges to hold the hood in registration with the opening, upper and lower mirrors adjustably supported within the hood, and a rear view mirror carried by the vehicle in line with the lower mirror.

In testimony whereof I affix my signature.

CLYDE E. PAXTON. [L. S.]